(12) United States Patent
Xu et al.

(10) Patent No.: US 11,049,022 B2
(45) Date of Patent: Jun. 29, 2021

(54) REALTIME RESPONSE TO NETWORK-TRANSFERRED CONTENT REQUESTS USING STATISTICAL PREDICTION MODELS

(71) Applicant: Microsoft Technology Licensing, LLC, Redmond, WA (US)

(72) Inventors: Liqin Xu, Fremont, CA (US); Peter Poon, Sunnyvale, CA (US); Wen Pu, Santa Clara, CA (US); Swetha Karthik, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 970 days.

(21) Appl. No.: 15/662,686

(22) Filed: Jul. 28, 2017

(65) Prior Publication Data
US 2019/0034809 A1   Jan. 31, 2019

(51) Int. Cl.
*G06N 5/04* (2006.01)
*G06Q 30/02* (2012.01)
*G06N 5/02* (2006.01)
*G06Q 30/00* (2012.01)
*G06N 3/08* (2006.01)
*G06N 20/20* (2019.01)
(Continued)

(52) U.S. Cl.
CPC ............ *G06N 5/022* (2013.01); *G06Q 30/00* (2013.01); *G06Q 30/0202* (2013.01); *G06N 3/0427* (2013.01); *G06N 3/08* (2013.01); *G06N 5/003* (2013.01); *G06N 20/20* (2019.01)

(58) Field of Classification Search
None
See application file for complete search history.

(56) References Cited

U.S. PATENT DOCUMENTS 9,465,873 B1 * 10/2016 Franke ............... G06Q 30/0206
10,311,372 B1 *  6/2019 Hotchkies ............... H04L 67/32
(Continued)

OTHER PUBLICATIONS

Agarwal, Deepak, et al. "Laser: A scalable response prediction platform for online advertising." Proceedings of the 7th ACM international conference on Web search and data mining. 2014. (Year: 2014).*
(Continued)

*Primary Examiner* — Hal Schnee
(74) *Attorney, Agent, or Firm* — Hickman Becker Bingham Ledesma LLP

(57) ABSTRACT

Techniques for leveraging existing statistical prediction models are provided. A first statistical prediction model is generated for a content item. An instruction is received to create a clone from the content item. In response to receiving the instruction, the clone is created based on attributes of the content item. A second statistical prediction model that is different than the first statistical prediction model is generated for the clone. In response to receiving a request for content, the clone is identified as relevant to the first request. A similarity between (1) first content of the content item and (2) second content of the clone is determined. If the similarity exceeds a similarity threshold, then the first statistical prediction model is used to generate a prediction of an entity user selection rate associated with the clone. Otherwise, the second statistical prediction model is used to generate the prediction.

20 Claims, 4 Drawing Sheets

(51) Int. Cl.
*G06N 5/00* (2006.01)
*G06N 3/04* (2006.01)

(56) References Cited

U.S. PATENT DOCUMENTS

| | | | | |
|---|---|---|---|---|
| 2006/0074769 | A1* | 4/2006 | Looney | G06Q 30/0251 |
| | | | | 705/14.66 |
| 2011/0112981 | A1* | 5/2011 | Park | G06Q 30/0282 |
| | | | | 705/347 |
| 2014/0108316 | A1* | 4/2014 | Goldman | G06Q 50/01 |
| | | | | 706/46 |
| 2014/0114746 | A1* | 4/2014 | Pani | G06Q 30/0241 |
| | | | | 705/14.45 |
| 2015/0073931 | A1* | 3/2015 | Ronen | G06Q 30/0631 |
| | | | | 705/26.7 |
| 2018/0181875 | A1* | 6/2018 | Motohashi | G06Q 10/04 |

OTHER PUBLICATIONS

Wei, Jian, et al. "Collaborative filtering and deep learning based recommendation system for cold start items." Expert Systems with Applications 69 (2017): 29-39. (Year: 2017).*

Felício, Crícia Z., et al. "A multi-armed bandit model selection for cold-start user recommendation." Proceedings of the 25th Conference on User Modeling, Adaptation and Personalization. 2017. (Year: 2017).*

* cited by examiner

REALTIME RESPONSE TO NETWORK-TRANSFERRED CONTENT REQUESTS USING STATISTICAL PREDICTION MODELS

TECHNICAL FIELD

The present disclosure relates to statistical prediction models and, more particularly to, leveraging such models for cloned content items. SUGGESTED ART UNIT: 2129. SUGGESTED CLASSIFICATION: 706/21.

BACKGROUND

The Internet allows end-users operating computing devices to request content from many different content providers. Some content providers desire to send additional content items to users who visit their respective websites or who otherwise interact with the content providers. To do so, content providers may rely on a third-party content delivery service that delivers the additional content items over one or more computer networks to computing devices of such users.

A third-party content delivery service may allow content providers to perform many actions with respect to content delivery campaigns that they create through the service. Actions include establishing a start date of a content delivery campaign, specifying criteria for ending the campaign, pausing the campaign, adjusting an intended audience of the campaign, allocating resources to the campaign, and cloning or copying the campaign. However, there is a disadvantage to the latter action in that any positive past performance of the campaign is not leveraged for the campaign clone. Because the campaign clone does not have data regarding past performance (due to the campaign clone being new), the campaign clone may perform worse or better (at least initially) compared to the current campaign.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for leveraging statistical prediction models for campaign clones are provided. In response to receiving a request to clone a content delivery campaign, clone data is created and used to associate (a) a statistical prediction model that has been (or is being) created for the content delivery campaign with (b) a clone of the campaign. Thereafter, if the clone is identified as a candidate during a content item selection event, the prediction model can be used to generate a predicted user selection rate for the clone. In some cases, the prediction model might not be shared with the clone, such as after the lapse of a certain amount of time or differences in targeting criteria or displayable content of the two campaigns.

System Overview

Figure 1:
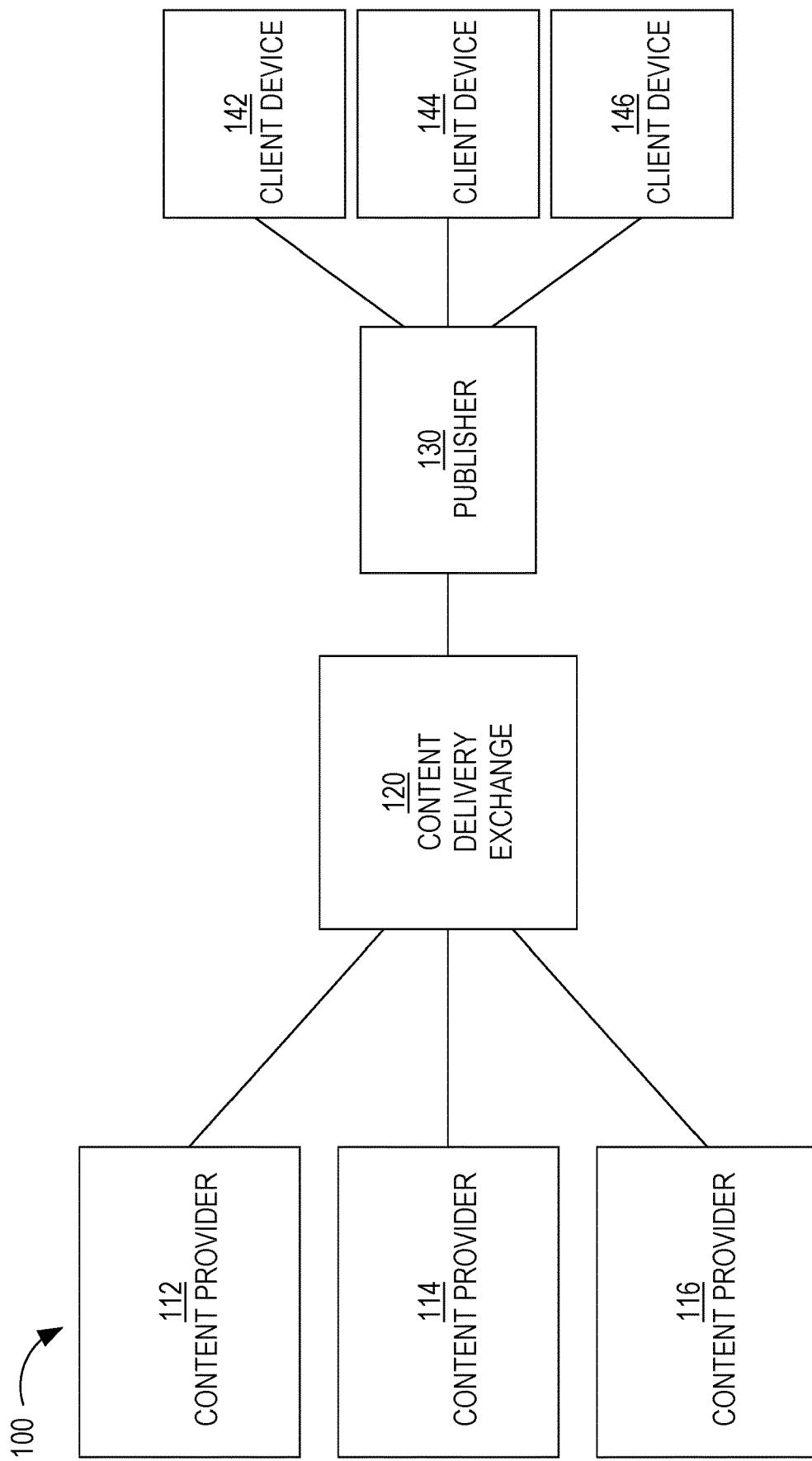
FIG. 1 is a block diagram that depicts a system for distributing content items to one or more end-users, in an embodiment.

FIG. 1 is a block diagram that depicts a system 100 for distributing content items to one or more end-users, in an embodiment. System 100 includes content providers 112-116, a content delivery exchange 120, a publisher 130, and client devices 142-146. Although three content providers are depicted, system 100 may include more or less content providers. Similarly, system 100 may include more than one publisher and more or less client devices.

Content providers 112-116 interact with content delivery exchange 120 (e.g., over a network, such as a LAN, WAN, or the Internet) to enable content items to be presented, though publisher 130, to end-users operating client devices 142-146. Thus, content providers 112-116 provide content items to content delivery exchange 120, which in turn selects content items to provide to publisher 130 for presentation to users of client devices 142-146. However, at the time that content provider 112 registers with content delivery exchange 120, neither party may know which end-users or client devices will receive content items from content provider 112, unless a target audience specified by content provider 112 is small enough.

An example of a content provider includes an advertiser. An advertiser of a product or service may be the same party as the party that makes or provides the product or service. Alternatively, an advertiser may contract with a producer or service provider to market or advertise a product or service provided by the producer/service provider. Another example of a content provider is an online ad network that contracts with multiple advertisers to provide content items (e.g., advertisements) to end users, either through publishers directly or indirectly through content delivery exchange 120.

Although depicted in a single element, content delivery exchange may comprise multiple computing elements and devices, connected in a local network or distributed regionally or globally across many networks, such as the Internet. Thus, content delivery exchange 120 may comprise multiple computing elements, including file servers and database systems.

Publisher 130 provides its own content to client devices 142-146 in response to requests initiated by users of client devices 142-146. The content may be about any topic, such as news, sports, finance, and traveling. Publishers may vary greatly in size and influence, such as Fortune 500 companies, social network providers, and individual bloggers. A content request from a client device may be in the form of a HTTP request that includes a Uniform Resource Locator (URL) and may be issued from a web browser or a software application that is configured to only communicate with publisher 130 (and/or its affiliates). A content request may be a request that is immediately preceded by user input (e.g., selecting a hyperlink on web page) or may initiated as part of a subscription, such as through a Rich Site Summary (RSS) feed. In response to a request for content from a client device, publisher 130 provides the requested content (e.g., a web page) to the client device.

Simultaneously or immediately before or after the requested content is sent to a client device, a content request is sent to content delivery exchange 120. That request is sent (over a network, such as a LAN, WAN, or the Internet) by publisher 130 or by the client device that requested the original content from publisher 130. For example, a web page that the client device renders includes one or more calls (or HTTP requests) to content delivery exchange 120 for one or more content items. In response, content delivery exchange 120 provides (over a network, such as a LAN, WAN, or the Internet) one or more particular content items to the client device directly or through publisher 130. In this way, the one or more particular content items may be presented (e.g., displayed) concurrently with the content requested by the client device from publisher 130.

In response to receiving a content request, content delivery exchange 120 initiates a content item selection event that involves selecting one or more content items (from among multiple content items) to present to the client device that initiated the content request. An example of a content item selection event is an auction.

Content delivery exchange 120 and publisher 130 may be owned and operated by the same entity or party. Alternatively, content delivery exchange 120 and publisher 130 are owned and operated by different entities or parties.

A content item may comprise an image, a video, audio, text, graphics, virtual reality, or any combination thereof. A content item may also include a link (or URL) such that, when a user selects (e.g., with a finger on a touchscreen or with a cursor of a mouse device) the content item, a (e.g., HTTP) request is sent over a network (e.g., the Internet) to a destination indicated by the link. In response, content of a web page corresponding to the link may be displayed on the user's client device.

Examples of client devices 142-146 include desktop computers, laptop computers, tablet computers, wearable devices, video game consoles, and smartphones.

Bidders

In a related embodiment, system 100 also includes one or more bidders (not depicted). A bidder is a party that is different than a content provider, that interacts with content delivery exchange 120, and that bids for space (on one or more publishers, such as publisher 130) to present content items on behalf of multiple content providers. Thus, a bidder is another source of content items that content delivery exchange 120 may select for presentation through publisher 130. Thus, a bidder acts as a content provider to content delivery exchange 120 or publisher 130. Examples of bidders include AppNexus, DoubleClick, and LinkedIn. Because bidders act on behalf of content providers (e.g., advertisers), bidders create content delivery campaigns and, thus, specify user targeting criteria and, optionally, frequency cap rules, similar to a traditional content provider.

In a related embodiment, system 100 includes one or more bidders but no content providers. However, embodiments described herein are applicable to any of the above-described system arrangements.

Content Delivery Campaigns

Each content provider establishes a content delivery campaign with content delivery exchange 120. A content delivery campaign includes (or is associated with) one or more content items. Thus, the same content item may be presented to users of client devices 142-146. Alternatively, a content delivery campaign may be designed such that the same user is (or different users are) presented different content items from the same campaign. For example, the content items of a content delivery campaign may have a specific order, such that one content item is not presented to a user before another content item is presented to that user.

A content delivery campaign has a start date/time and, optionally, a defined end date/time. For example, a content delivery campaign may be to present a set of content items from Jun. 1, 2015 to Aug. 1, 2015, regardless of the number of times the set of content items are presented ("impressions"), the number of user selections of the content items (e.g., click throughs), or the number of conversions that resulted from the content delivery campaign. Thus, in this example, there is a definite (or "hard") end date. As another example, a content delivery campaign may have a "soft" end date, where the content delivery campaign ends when the corresponding set of content items are displayed a certain number of times, when a certain number of users view the set of content items, select or click on the set of content items, or when a certain number of users purchase a product/service associated with the content delivery campaign or fill out a particular form on a website.

A content delivery campaign may specify one or more targeting criteria that are used to determine whether to present a content item of the content delivery campaign to one or more users. Example factors include date of presentation, time of day of presentation, characteristics of a user to which the content item will be presented, attributes of a computing device that will present the content item, identity of the publisher, etc. Examples of characteristics of a user include demographic information, residence information, job title, employment status, academic degrees earned, academic institutions attended, former employers, current employer, number of connections in a social network, number and type of skills, number of endorsements, and stated interests. Examples of attributes of a computing device include type of device (e.g., smartphone, tablet, desktop, laptop), current geographical location, operating system type and version, size of screen, etc.

For example, targeting criteria of a particular content delivery campaign may indicate that a content item is to be presented to users with at least one undergraduate degree, who are unemployed, who are accessing from South America, and where the request for content items is initiated by a smartphone of the user. If content delivery exchange 120 receives, from a computing device, a request that does not satisfy the targeting criteria, then content delivery exchange 120 ensures that any content items associated with the particular content delivery campaign are not sent to the computing device.

Thus, content delivery exchange 120 is responsible for selecting a content delivery campaign in response to a request from a remote computing device by comparing (1) targeting data associated with the computing device and/or a user of the computing device with (2) targeting criteria of one or more content delivery campaigns. Multiple content delivery campaigns may be identified in response to the request as being relevant to the user of the computing device. Content delivery campaign 120 may select a strict subset of the identified content delivery campaigns from which content items will be identified and presented to the user of the computing device.

Instead of one set of targeting criteria, a single content delivery campaign may be associated with multiple sets of targeting criteria. For example, one set of targeting criteria may be used during one period of time of the content delivery campaign and another set of targeting criteria may be used during another period of time of the campaign. As another example, a content delivery campaign may be associated with multiple content items, one of which may be associated with one set of targeting criteria and another one of which is associated with a different set of targeting criteria. Thus, while one content request from publisher 130 may not satisfy targeting criteria of one content item of a campaign, the same content request may satisfy targeting criteria of another content item of the campaign.

Different content delivery campaigns that content delivery exchange 120 manages may have different charge models. For example, content delivery exchange 120 may charge a content provider of one content delivery campaign for each presentation of a content item from the content delivery campaign (referred to herein as cost per impression or CPM). Content delivery exchange 120 may charge a content provider of another content delivery campaign for each time a user interacts with a content item from the content delivery campaign, such as selecting or clicking on the content item (referred to herein as cost per click or CPC). Content delivery exchange 120 may charge a content provider of another content delivery campaign for each time a user performs a particular action, such as purchasing a product or service, downloading a software application, or filling out a form (referred to herein as cost per action or CPA). Content delivery exchange 120 may manage only campaigns that are of the same type of charging model or may manage campaigns that are of any combination of the three types of charging models.

A content delivery campaign may be associated with a resource budget (or "resource allocation") that indicates how much the corresponding content provider is willing to be charged by content delivery exchange 120, such as $100 or $5,200. A content delivery campaign may also be associated with a bid amount (or "resource reduction request amount") that indicates how much the corresponding content provider is willing to be charged for each impression, click, or other action. For example, a CPM campaign may bid five cents for an impression, a CPC campaign may bid five dollars for a click, and a CPA campaign may bid five hundred dollars for a conversion (e.g., a purchase of a product or service).

Content Item Selection Events

As mentioned previously, a content item selection event is when multiple content items are considered and a subset selected for presentation on a computing device in response to a request. Thus, each content request that content delivery exchange 120 receives triggers a content item selection event.

Specifically, in response to receiving a content request, content delivery exchange 120 analyzes multiple content delivery campaigns to determine whether attributes associated with the content request (e.g., attributes of a user that initiated the content request, attributes of a computing device operated by the user, current date/time) satisfy targeting criteria associated with each of the analyzed content delivery campaigns. If so, the content delivery campaign is considered a candidate content delivery campaign. One or more filtering criteria may be applied to a set of candidate content delivery campaigns to reduce the total number of candidates.

A final set of candidate content delivery campaigns is ranked based on one or more criteria, such as predicted click-through rate (which may be relevant only for CPC campaigns), effective cost per impression (which may be relevant to CPC, CPM, and CPA campaigns), and/or bid price. Each content delivery campaign may be associated with a bid price (or "resource reduction request amount") that represents how much the corresponding content provider is willing to pay (e.g., content delivery exchange 120) for having a content item of the campaign presented to an end-user or selected by an end-user. Different content delivery campaigns may have different bid prices. Generally, content delivery campaigns associated with relatively higher bid prices will be selected for displaying their respective content items relative to content items of content delivery campaigns associated with relatively lower bid prices. Other factors may limit the effect of bid prices, such as objective measures of quality of the content items (e.g., actual click-through rate (CTR) and/or predicted CTR of each content item), budget pacing (which controls how fast a campaign's budget is used and, thus, may limit a content item from being displayed at certain times), frequency capping (which limits how often a content item is presented to the same person), and a domain of a URL that a content item might include.

An example of a content item selection event is an advertisement auction.

In one embodiment, content delivery exchange 120 conducts one or more content item selection events. Thus, content delivery exchange 120 has access to all data associated with making a decision of which content item(s) to select, including bid price of each campaign in the final set of content delivery campaigns, an identity of an end-user to which the selected content item(s) will be presented, an indication of whether a content item from each campaign was presented to the end-user, a predicted CTR of each campaign, a CPC or CPM of each campaign.

In another embodiment, an exchange that is owned and operated by an entity that is different than the entity that owns and operates content delivery exchange 120 conducts one or more content item selection events. In this latter embodiment, content delivery exchange 120 sends one or more content items to the other exchange, which selects one or more content items from among multiple content items that the other exchange receives from multiple sources. In this embodiment, content delivery exchange 120 does not know (a) which content item was selected if the selected content item was from a different source than content delivery exchange 120 or (b) the bid prices of each content item that was part of the content item selection event. Thus, the other exchange may provide, to content delivery exchange 120 (or to a performance simulator described in more detail herein), information regarding one or more bid prices and, optionally, other information associated with the content item(s) that was/were selected during a content item selection event, information such as the minimum winning bid or the highest bid of the content item that was not selected during the content item selection event.

Tracking User Interactions

Content delivery exchange 120 tracks one or more types of user interactions across client devices 142-146 (and other client devices not depicted). For example, content delivery exchange 120 determines whether a content item that content delivery exchange 120 delivers is presented at (e.g., displayed by or played back at) a client device. Such a "user interaction" is referred to as an "impression." As another example, content delivery exchange 120 determines whether a content item that exchange 120 delivers is selected by a user of a client device. Such a "user interaction" is referred to as a "click." Content delivery exchange 120 stores such data as user interaction data, such as an impression data set and/or a click data set.

For example, content delivery exchange 120 receives impression data items, each of which is associated with a different instance of an impression and a particular content delivery campaign. An impression data item may indicate a particular content delivery campaign, a specific content item, a date of the impression, a time of the impression, a particular publisher or source (e.g., onsite v. offsite), a particular client device that displayed the specific content item, and/or a user identifier of a user that operates the particular client device. Thus, if content delivery exchange 120 manages multiple content delivery campaigns, then different impression data items may be associated with different content delivery campaigns. One or more of these individual data items may be encrypted to protect privacy of the end-user.

Similarly, a click data item may indicate a particular content delivery campaign, a specific content item, a date of the user selection, a time of the user selection, a particular publisher or source (e.g., onsite v. offsite), a particular client device that displayed the specific content item, and/or a user identifier of a user that operates the particular client device.

Machine Learning Approach

In an embodiment, machine learning is used to generate a statistical prediction model that is used to predict user selection rates for different content items. Machine learning is a subfield of computer science that evolved from the study of pattern recognition and computation learning theory in artificial intelligence. Machine learning explores the study and construction of algorithms that can learn from and make predictions on data. Such algorithms operate by building a model from an example training set of input observations in order to make data-driven predictions or decisions expressed as outputs, rather than following strictly static program instructions.

Machine learning is employed in a range of computing tasks where designing and programming explicit algorithms is unfeasible. Example applications include spam filtering, optical character recognition (OCR), search engines and computer vision.

Within the field of data analytics, machine learning is a method used to devise complex models and algorithms that lend themselves to prediction. These analytical models allow researchers, data scientists, engineers, and analysts to "produce reliable, repeatable decisions and results" and uncover "hidden insights" through learning from historical relationships and trends in the data.

Any machine learning technique may be used to generate the statistical prediction model, such as random decision forests, artificial neural networks, and regression, which includes linear regression, ordinary least squares regression, and logistic regression. After a regression technique is applied to a set of training data, a resulting statistical prediction model may comprise multiple learned coefficients, each associated with a different feature.

In an embodiment, a statistical prediction model is generated for a particular content delivery campaign and/or a particular content item of a particular content delivery campaign. Thus, if a content delivery campaign is associated with multiple content items, then a prediction model may be generated for each content item, referred to herein as a "per-creative model."

A per-creative model is generated based on multiple factors, including historical user interaction data with the corresponding content item (e.g., click, share, comment) to train the per-creative model. If no such historical performance data is available, then a default user selection rate may be used.

Other features upon which a per-creative model may be generated include characteristics of the corresponding content item or corresponding campaign, such as whether there is an image associated with the content item, characteristics of the image (e.g., number of colors, identification of the colors, size, width, height, etc.), and characteristics of any text (e.g., number of characters, number of words, instances of any certain words, etc.).

When training a prediction model, content item features (including campaign features and content provider features) and/or content item features interactions with user features are used. But when finally generating a per-creative model for a specific content item, the content item features are fixed for this content item. Thus, the content item features are used to precompute the final coefficients of the per-creative model. The content item features are then not in the per-creative model coefficients.

In an embodiment, a predicted user selection rate is not solely based upon a per-creative model, but also based upon another statistical prediction model, referred to herein as a "global model." The global model may be based on user features, such as job title, industry, employment status, former or current employer, academic degrees, academic institutions attended, listed skills, endorsements from other users, number of connections to other users in a social network, user selection history (e.g., a personal CTR), demographic information, online activity (e.g., number of posts, follows, shares, likes, and comments; specific web sites visited), residence information, etc. Some of this information may be provided by the user him/herself in a user profile that is maintained by a social network provider. The user features are a per-creative model and in the global model may be the same. For example, in a per-creative model, user feature are crossed with content item features while, in the global model, the user features are used by themselves.

Additionally or alternatively, the global model may be based on contextual features, such as date/time characteristics (e.g., the day of the week, whether the current day is a weekend, whether the current day is a holiday, time of the day) and characteristics of the client device (e.g., current geographic location, type of operating system, type of device (e.g., smartphone, tablet computer, laptop computer), application that initiated the request (e.g., browser or other third-party application)).

If a user selection rate is predicted using multiple prediction models (e.g., a per-creative model and a global model), then the output of the prediction models may be combined in one of numerous ways, such as summing, averaging, weighting, etc.

A prediction of a user selection rate of a content item or content delivery campaign may be calculated in response to each request (i.e., "on-the-fly"), or periodically, such as hourly or daily, in order to keep response latency to a minimum.

Additionally, a prediction model may be updated regularly, such as every hour, six hours, or every day, based on new user interaction data that is received and processed by content delivery exchange 120 (or associated components).

Example Process

Figure 2:
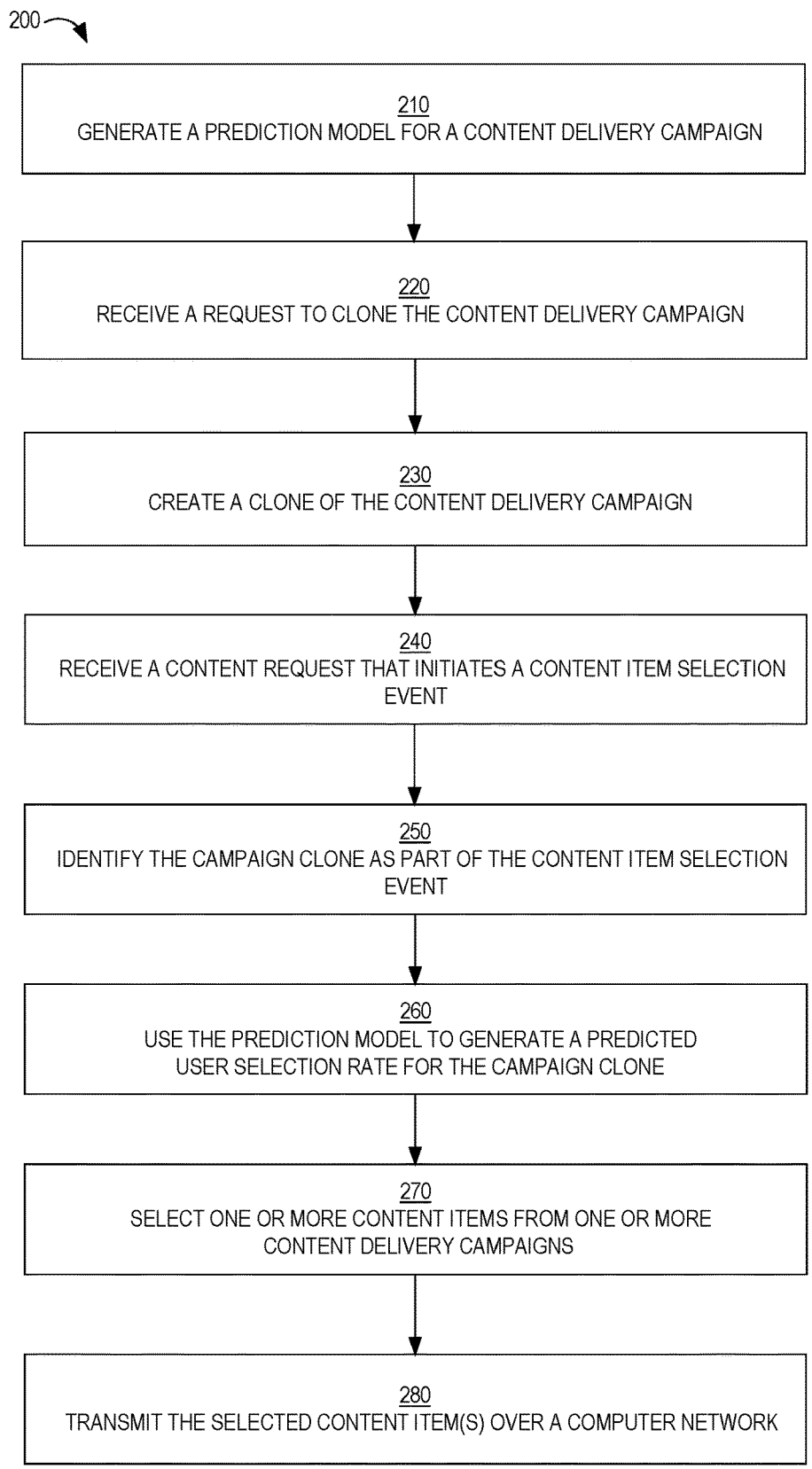
FIG. 2 is a flow diagram that depicts a process for sharing a statistical prediction model of one content delivery campaign with another content delivery campaign, in an embodiment.

FIG. 2 is a flow diagram that depicts a process 200 for sharing a statistical prediction model of one content delivery campaign with another content delivery campaign, in an embodiment. "Sharing" a prediction model refers to using a prediction model that has been generated based on user interaction data with respect to a first content delivery campaign to generate a predicted user selection rate for a second content delivery campaign. In embodiments described herein, a prediction model of a content delivery campaign is shared with a clone of that campaign. Process 200 may be implemented by one or more components of content delivery exchange 120.

At block 210, a statistical prediction model is generated for a content delivery campaign, referred to herein as the "original campaign." The statistical prediction model generates a prediction of an entity (or user) selection rate. An example of a user selection rate is a click-through rate. The prediction represents a likelihood that a user will select or click on a content item that is presented to the user. User selection may comprise a click of a mouse button, a tap of a finger on a touchscreen display (e.g., on a smartphone or tablet computer), an audible command, or brain waves that are translated into a signal that causes a particular content item to be selected. The selected content item may be displayed among multiple other content items that could be selected.

The statistical prediction model is trained based on user selection history that indicates past performance of the original campaign; particularly, a number of times a content item of the original campaign has been presented to end-users and a number of times an end-user has selected (or click on) a content item of the original campaign. The statistical prediction model may also be trained based on attributes of users to whom the content item(s) was/were presented and attributes of users that selected (and/or not did not select) the content item(s).

If an original campaign is associated with multiple content items, then a different statistical prediction model may be generated for each content item. Alternatively, a single statistical prediction model is generated for such an original campaign and is based on user selection history of all the content items associated therewith.

In another embodiment, a prediction model of an original campaign is simply an actual (or observed) user selection rate of the original campaign. Thus, no machine learning technique is used to generate the prediction model. Instead, the prediction model is updated solely based on new user interaction data that content delivery exchange 120 receives from time to time. In this embodiment, relatively older user interaction data (e.g., reflecting clicks and impression) may have less effect on the current user selection rate than relatively newer user interaction data.

At block 220, a request to clone the original campaign is received. The request may specify or include an identifier of the original campaign. The request may be initiated by a representative of the content provider that is responsible for the original campaign interacting with a graphical user interface provided by content delivery exchange 120. Alternatively, the request may be submitted through a dedicated client application executing on a computing device of the representative. In either scenario, the request is transmitted over a computer network and received and processed at content delivery exchange 120.

Additionally or alternatively, the request may indicate or specify a set of one or more content items associated with the original campaign. The set of content items of the original campaign may be a strict subset of all content items of the original campaign. Thus, the request may be to clone a specific content item within the original campaign and not the entire original campaign.

Prior to block 220, the prediction model may have been used one or more times to generate a predicted user selection rate for the original campaign (e.g., during one or more content item selection events initiated by one or more ad requests) or for a specific content item of the original campaign.

At block 230, in response to receiving the request, a clone of the original campaign is created. The clone is referred to herein as a "campaign clone." The clone has one or more attributes in common with the original campaign. If the request is to clone a content item of an original campaign, then the clone is referred to herein as a "content item clone."

Creation of the campaign clone (or content item clone) may involve creating a new entry in a campaign database that contains data about multiple content delivery campaigns, some of which may be in different states, such as an inactive state, an active state, a paused state, a deactivated state, and a deleted state. The request to clone may specify one or more changes that are applied to the clone (e.g., different targeting criteria, different charging model, different content for a content item, different resource allocation, etc.), but not the original campaign/content item. Alternatively, a change request that is subsequent to the clone request may specify the one or more changes (if any).

If the request in block 220 specified just the original campaign, then block 230 may also involve presenting, to the user (e.g., via a user interface), one or more content items of the original campaign and allowing the user to select a strict subset of all content items of the original campaign (if there are multiple content items of the original campaign). If the original campaign is only associated with a single content item, then selection of the original campaign is considered selection of that content item.

Once the original campaign or one or more content items of the original campaign are selected, block 230 may involve generating clone data that associates the original campaign with the campaign clone (or associates an original content item with a content item clone). The clone data may be a mapping that maps an identifier of the original campaign to an identifier of the campaign clone. The clone data is used to associate a prediction model of the original campaign (or original content item) with the clone (whether campaign clone or content item clone) so that the prediction model may be used in response to subsequent content requests for which the clone is relevant.

If the original campaign is associated with multiple content items (and multiple content items of the original campaign are cloned), then block 230 may involve generating a mapping for each content item. For example, if original campaign OC has three content items (OCI1, OCI2, and OCI3) and OC is cloned to create campaign clone CC, then CC may be associated with cloned content items CCI1, CCI2, and CCI3, and the following mappings are generated: OCI1→CCI1, OCI2→CCI2, and OCI3→CCI3 (unless a request to clone only covered a strict subset of the content items of the original campaign). If each content item of the original campaign OC is associated with a different prediction model, then a different one of the mappings is used to associate (1) the prediction model of an OCI with (2) a CCI of the campaign clone CC.

Implicit or explicit in (or subsequent to) the clone request may be an instruction to deactivate or delete the original campaign/content item. In such a scenario, even though the original campaign/content item might not be available to be a candidate for selection in future content item selection events, the prediction model may still be used for the clone. If there is no implicit or explicit instruction to deactivate or delete the original campaign/content item, then the prediction model may be used when the original campaign/content item and the clone are considered as candidates in subsequent content item selection events.

At block 240, a request for content is received. The request is initiated from a computing device operated by an end user. The request may be initiated from a browser (executing on the computing device) executing (e.g., JavaScript) code within a webpage. Alternatively, the request may be initiated by a dedicated application (e.g., a "smartphone app") that transmits the request in response to user input (e.g., requesting a new page or document, or scrolling through a feed).

The request may have traversed one or more networks prior to being received at content delivery exchange 120. The request may have originated at the computing device or may have originated from a third-party content exchange that interacts with content delivery exchange 120 to allow content delivery exchange 120 to bid on behalf of one or more content providers for presenting their respective content items on third-party publishers that interact with the third-party content exchange and that interact with computing devices of end-users, such as the end-user computing device described herein.

At block 250, in response to receiving the request, a content item selection event begins. As part of the content item selection event, multiple content delivery campaigns are identified. The content delivery campaigns may be identified because targeting data associated with the request satisfies (at least partially) the targeting criteria of each of the identified campaigns. One of the identified campaigns is the campaign clone.

At block 260, a prediction model associated with the original campaign/content item is used for the clone to predict an entity (or user) selection rate associated with the request. The higher the predicted user selection rate of a content delivery campaign or of a content item, the greater the likelihood that that content delivery campaign (or one of its content items) will be selected during the content item selection event. Another factors that increases the likelihood of selection is a resource reduction request amount (or bid) associated with the content delivery campaign. The higher the resource reduction request amount of a content delivery campaign, the greater the likelihood that that content delivery campaign (or one of its content items) will be selected during the content item selection event.

At block 270, the content item selection event concludes with a selection of one or more content items associated with one or more of the identified content delivery campaigns.

At block 280, the one or more selected content items are transmitted over a network. Block 280 may involve sending the selected content item(s) to (a) a third-party exchange (from which the request was received, in which case the third-party exchange conducts its own content item selection event) or (b) a computing device where the selected content item(s) will be presented (e.g., displayed on a screen of the computing device or played back by a video or audio player executing on the computing device).

Criteria for Sharing an Existing Prediction Model

In an embodiment, a prediction model associated with an original campaign/content item is shared with a clone only if one or more criteria are satisfied. One example criterion is time. For example, if a campaign clone has been active for less than two days, then the prediction model of the original campaign is used when predicting a user selection rate for the campaign clone (or for a content item of the campaign clone). Otherwise, a prediction model of the clone is used. A rationale for a time limit is that after a certain period of time, enough user selection rate history of the clone should have been collected (e.g., by content delivery exchange 120) to generate an accurate prediction model for the clone.

Another example criterion is whether the clone is different than the original campaign/content item in certain respects. One example of a difference between a campaign clone and an original campaign is the target audience. Different attributes of the different target audiences may be considered. For example, any difference in the targeting criteria of the clone and the targeting criteria of the original campaign/content item results in no sharing of a prediction model of the original campaign/content item with the clone. As another example, a collective CTR of the target audience of the campaign clone is calculated and compared to a collective CTR of the target audience of the original campaign/content item. If the difference between the two CTRs is less than a particular threshold (e.g., less than 5% difference from each other), then sharing of a prediction model of the original campaign/content with the clone is allowed. As another example, a common set of users in both the target audience of the campaign clone and the target audience of the original campaign is identified. If the common set represents greater than a certain threshold of one or both target audiences (e.g., 90%), then sharing of a prediction model of the original campaign with the campaign clone is allowed.

Another example of a difference is if the charging model of the campaign clone is different than the charging model of the original campaign. For example, the original campaign may be a CPM campaign while the campaign clone may be a CPC campaign. Thus, if the charging models of the respective campaigns are different, then the prediction model of the original campaign is not shared with the campaign clone.

Another example of a difference is in content of respective content items. For example, if an image or text of a content item clone is different than the image or text of the original content item (which may be determined by identifiers of the respective data items), then the prediction model of the original content item is not shared with the content item clone. In a related embodiment, if the extent of the of difference between a content item clone and the original content item is relatively small, then a prediction model of the original content item is shared with the content item clone. For example, if the text changed only a small amount (e.g., 10% more words, 5% less words, or no removal or addition of any words that are pre-defined as "keywords"), then prediction model sharing is allowed. As another example, if only the size of the image changed, then prediction model sharing is allowed.

Example System

Figure 3:
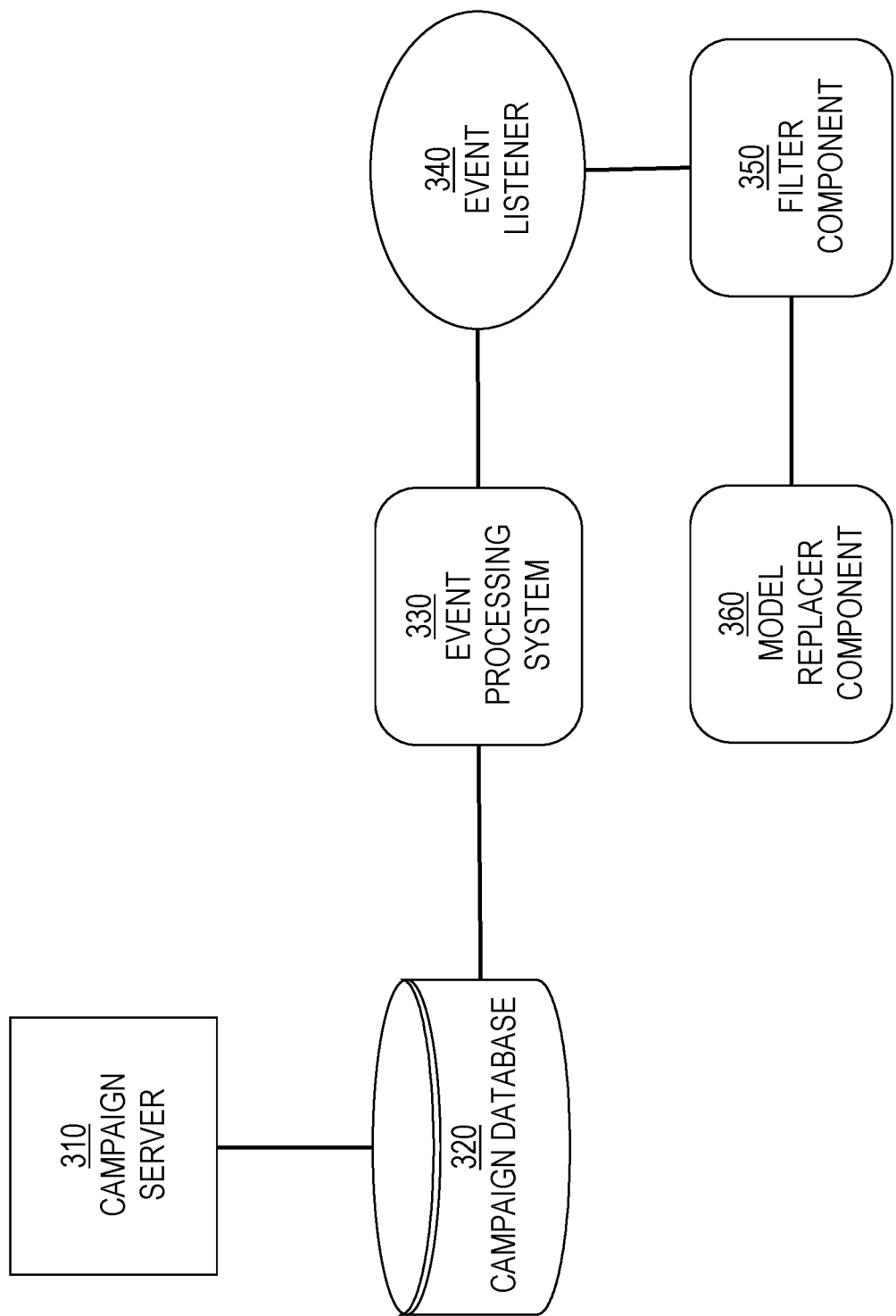
FIG. 3 is a block diagram that depicts an example system for sharing prediction models with campaign clones, in an embodiment.

FIG. 3 is a block diagram that depicts an example system 300 for sharing prediction models with campaign clones, in an embodiment. System 300 includes a campaign server 310, a campaign database 320, an event processing system 330, an event listener 340, a filter component 350, and a model replacer component 360. In other embodiments, tasks or operations performed by different components of system 300 may be performed by a single component of system 300 or a single task or operation performed by a component of system 300 may be performed by multiple components (even components not depicted) of system 300.

Campaign server 310 is implemented in hardware, software, or any combination of hardware and software. Campaign server 310 may be implemented on one or more computing devices. Campaign server 310 receives a request to clone an original campaign that has been active (i.e., available as a candidate for selection in content item selection events). The request may come over a network from a computing device of a representative of a content provider that initiated the campaign clone. For example, campaign server 310 (or another component of system 300 not depicted) transmits a graphical user interface that allows the representative to perform one or more actions relative to one or more campaigns initiated by the content provider, such as creating a campaign, specifying targeting criteria of a campaign, specifying a (or selecting) resource allocation (e.g., a total or daily budget) for a campaign, specifying (or selecting) a resource reduction request amount (e.g., a bid), specifying a start date (or starting criteria) and an end date (or ending criteria), identifying data items for a content item (e.g., one or more images, text, graphics), viewing multiple accounts (each associated with a group of campaigns) that the content provider initiated, viewing a campaign group (each associated with one or more campaigns), viewing past campaigns, viewing performance of past and currently active campaigns, searching across accounts or campaign groups for campaigns that satisfy certain criteria, and cloning a campaign.

In response to receiving a clone request that identifies a particular campaign or content item, campaign server 310 determines an identifier for the campaign clone/content item. (Although reference is made herein to "campaign clone," embodiments are also applicable to cloned content items, which may be associated with the same campaign as the original content item from which the clone is created.) The identifier may be determined in a number of ways, such as a monotonically increasing number (that is increased every time a new campaign/content item is created), or based on the current identifier of the original campaign.

In response to the clone request, campaign server 310 also creates an entry in campaign database 320 that stores data about the campaign clone. Such an entry may be populated by copying the data of the original campaign and storing the copied data into the entry. Campaign database 320 may be a relational database, an object database, an object-relational database, a NoSQL database (or key-value store). Thus, the entry may be implemented as, for example, a record in a relation (e.g., a row in a table), an object, or a key-value pair. In response to the clone request, campaign server 310 (or an associated component (not depicted), such as an event publisher) creates an event that refers the original campaign and the campaign clone. The event may include a campaign identifier that uniquely identifies the original campaign, a clone identifier that uniquely identifies the campaign clone, and a type identifier that identifies a type of the event (e.g., a "Clone Campaign"). The event may also indicate a time regarding when the event was created. Campaign server 310 causes the event to be published (or sent) to the event processing system 330.

An example of event processing system 330 is Apache Kafka, which is a stream processing platform written in Scala and Java. The storage layer is a scalable publication-subscribe message queue architected as a distributed transaction log.

Event listener 340 is a program that subscribes (e.g., "listens") to events that have a particular type. Event listener 340 identifies events that individually indicate that a campaign has been cloned and stores those events to a certain storage location that is available to another process, such as an offline process. Event listener 340 may execute periodically, such as every twenty minutes, every hour, or every day. In that way, the list of events that event listener 340 identifies and stores may be updated regularly. Event listener 340 may read events with dates or timestamps that are within a certain period of time, such as the last week or month. One reason for a long time window is because even though a campaign may be cloned on a particular day, the cloned campaign may not begin for days or weeks after that particular day.

Filter Component

Filter component 350 reads the events from the certain storage location and filters the events based on one or more criteria, such as the one or more filter criteria described previously, including the time-based criteria, the target audience criteria, the charging model criteria, and the content-based criteria. For example, if the filter criteria is time-based criteria, then filter component 350 determines whether the campaign clone has been active for a threshold period of time. If not, then filter component 350 stores the event or retains the association between the original campaign and the campaign clone. Otherwise, filter component 350 filters out (or removes) the event (or the mapping that the event reflects). In other words, the association between the original campaign and the campaign clone is not used to associate a prediction model of the original campaign with the campaign clone.

As another example, if the filter criteria is based on the target audience, then filter component 350 may determine one or more attributes (e.g., size, user selection rate) of the target audience of the original campaign and determine one or more corresponding attributes of the target audience of the campaign clone. Filter component 350 may then compare the respective attributes (e.g., compare size or user selection rate) or analyze their differences (e.g., determine an amount of overlap in actual targeted users). If the respective target audiences are sufficiently different (e.g., based on a pre-defined threshold or criteria), then filter component 350 removes the event/association.

Removing or filtering out an event or association may involve (a) deleting the event from the storage location, (b) not using the event/association to associate a prediction model of the original campaign with the campaign clone (in the scenario where filter component 350 performs the model associating), or (c) not storing the event or association in a designated storage location (in the scenario where model replacer component 360 performs the model associating).

Filter component 350 may determine how long a campaign clone has been active in one of multiple ways. For example, filter component 350 may access an impression data set using the campaign clone identifier as a key. The impression data set may be aggregated at multiple levels, such as by hour, by day, by week, and/or by month. Based on the impression data set and the campaign clone identifier, filter component 350 may determine that an impression of a content item of the campaign clone occurred a week prior to the current time, which time range may be greater than the time-based criteria (e.g., last two days).

Filter component 350 may be implemented in software, hardware, or any combination of software and hardware. Filter component 350 may be implemented as a job (which is a unit of work or unit of execution that performs the work) in a distributed computing environment. As a unit of work, a component of a job is called a task or a step. As a unit of execution, a job may be concretely identified with a single process, which may in turn have sub-processes (child processes, the process corresponding to the job being the parent process) which perform the tasks or steps that comprise the work of the job.

An example of a distributed computing environment is Apache Hadoop, which is a software framework used for distributed storage and processing of big data sets using the MapReduce programming model.

In order to obtain data regarding attributes of an original campaign and a campaign clone, filter component 350 may have access to campaign database 320, either directly or indirectly. For example, a copy or backup of campaign database 320 may be available and may be kept synchronously (or asynchronously) with respect to campaign database 320. Thus, filter component 350 may send a request to a process to retrieve one or more attributes (e.g., target audience (which may be in the form of a list of user identifiers or a set of criteria (e.g., software engineers with a master's degree)), charging model type, or data items that make up a content item of a campaign) of the original campaign and the cloned campaign.

A result that filter component 350 produces is a list of events, associations, or mappings, each of which associate an original campaign with a campaign clone (e.g., using respective identifiers).

Model Replacer Component

Model replacer component 360 identifies the list of events/associations/mappings (referred to herein as a "clone mapping") and uses the clone mapping (if not empty) to associate, for each mapping, a prediction model of an original campaign with the corresponding campaign clone. The associating may be performed in one of multiple ways. For example, model replacer component 360 reads a model mapping (which maps per-creative models to their respective campaign identifiers). The model mapping includes per-creative models of campaign clones, including campaign clones that have only been active for a short period of time and for which there may be very little history. Model replacer component 360 performs a join (or some other operation) of the model mapping with the clone mapping. The join finds an entry in the model mapping whose campaign identifier matches an identifier of an original campaign in the clone mapping. If there is a match, then the per-creative model of the original campaign replaces (or overwrites) the per-creative model of the corresponding campaign clone. For example, if a clone mapping includes the mapping OC1 (an original campaign)→CC1 (a campaign clone), then a per-creative model for CC1 is replaced with a per-creative model for OC1. The per-creative models may then be made available to content delivery exchange 120, which will select per-creative models associated with candidate content delivery campaigns during content item selection events.

Model replacer component 360 may be implemented as a job that is triggered to execute when filter component 350 completes. For example, a job scheduler (not depicted) may determine that filter component 350 completes its tasks and, upon that determination, notifies model replacer component 360 that it can begin. As another example, model replacer component 360 may read from a certain location periodically (e.g., every twenty minutes or every hour) and, based on a previous timestamp associated with the list, determine whether the list has already been processed by model replacer component 360 previously. If not, model replacer component 360 processes the list, as described above. Otherwise, model replacer component 360 ceases or "goes to sleep." Model replacer component 360 may "wake up" automatically. The time period between "wakings" of model replacer component 360 may depend on whether model replacer component 360 processed a non-empty list previously. If so, then the time period is one length of time (e.g., thirty minutes); otherwise, the time period is a different length of time (e.g., five minutes).

After one or more per-creative models of one or more original campaigns are associated with one or more corresponding campaign clones, the per-creative models are made available (or accessible) to content delivery exchange 120, which is an online system that conducts content item selection events "on-the-fly" or in near real-time (e.g., a few hundred milliseconds). During a content item selection event, multiple per-creative models may be used to generate multiple predictions, each indicating a likelihood that an end-user (e.g., the specific user that initiated the content item request that initiated the content item selection event) will select the candidate campaign that is associated with the per-creative model.

Modifying an Existing Content Delivery Campaign

A content provider may change one or more attributes of a content delivery campaign, such as the target audience, the charging model, or content of one or more content items of the content delivery campaign. In an embodiment, in response to detecting such a change, content delivery exchange 120 ceases to use a per-creative model of the changed content delivery campaign and instead relies on a default prediction model or a default user selection rate.

In an embodiment, not any change to a campaign will cause the per-creative model of the campaign to be dropped or not used. The change to a campaign must be "significant." An example of an insignificant change is a change to a bid or budget of the campaign, which does not have an effect on the target audience or quality of the content items and, thus, the actual (observed) user selection rate should remain the same. Another example of an insignificant change is a small change in the size of the target audience or in the (e.g., average or median) user selection rate of the target audience. However, if, for example, the target audience is considerably larger or smaller or if the new target audience has a user selection rate that is 10% less than the original target audience, then the per-creative model of the campaign will not be used.

Another example of a significant change to a content delivery campaign is any change to a content item of the campaign. Alternatively, the amount or type of change may be considered before determining whether the change is significant. For example, if a digital image of a content item is the same, but the location of text of the content item changes, then that may be considered an insignificant change. As another example, if a new digital image is added to a content item that did not previously have one or if the new digital image replaces an existing digital image, then the change is considered significant. As another example, if less than 10% of the text within a content item changes, then that is considered an insignificant change.

In an embodiment, after a change (or significant change) to a content delivery campaign, any subsequently used user selection rate for the changed campaign is capped to be no greater than the user selection rate predicted using the per-creative model of the campaign before the change. For example, if the predicted user selection rate of a content delivery campaign was 2% before a change, then the predicted user selection rate after the change can be no greater than 2%, at least for a period of time after the change (e.g., two days). Such a ceiling on subsequently determined (or calculated) predicted user selection rates prevents malicious content providers with poor performing content delivery campaigns from artificially inflating (at least initially) the subsequent predicted user selection rates.

Benefits

A benefit of some embodiments described herein includes allowing a campaign clone to leverage existing user selection history of the corresponding original campaign. A content provider may decide to clone a campaign in response to a change in how campaigns are organized and presented to the content providers. For example, at one point in time, content delivery exchange 120 may allow a content provider to open up a single account and create multiple campaigns, but the campaigns are organized under the single account. Later, content delivery exchange 120 may allow the content provider to open up multiple accounts, create one or more campaign groups within each account, and create one or more campaigns within each campaign group. Moving a content delivery campaign from one account to another or from one campaign group to another may cause the campaign to lose (or be disassociated with) the user selection history (or per-creative model(s)) with which the campaign is associated. If the content delivery campaign has a relatively high user selection rate, then losing that user selection rate might dissuade from the content provider from moving or cloning the content delivery campaign ever, because doing so would likely cause the campaign clone to perform poorly, at least initially.

A benefit of some embodiments described herein include preventing malicious content providers from artificially boosting their relatively poor performing campaigns by cloning their campaigns, which might increase their associated user selection rate (if a default (e.g., average) user selection rate is used when a campaign is new), at least initially. For example, a content provider has a poor performing campaign and the corresponding per-creative model is based on that poor performance (i.e., low user selection rate). The content provider seeks to improve the poor performing campaign by cloning the campaign, believing that the campaign clone would start off with a "clean slate" or a default per-creative model that reflects an average user selection rate across many campaigns. However, with embodiments herein, the campaign clone will be associated with (at least initially) the per-creative model of the original campaign. Therefore, the campaign clone with not have a greater chance of being selected in a content item selection event based on the shared per-creative model since the per-creative model is the same as the one used for the original campaign.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
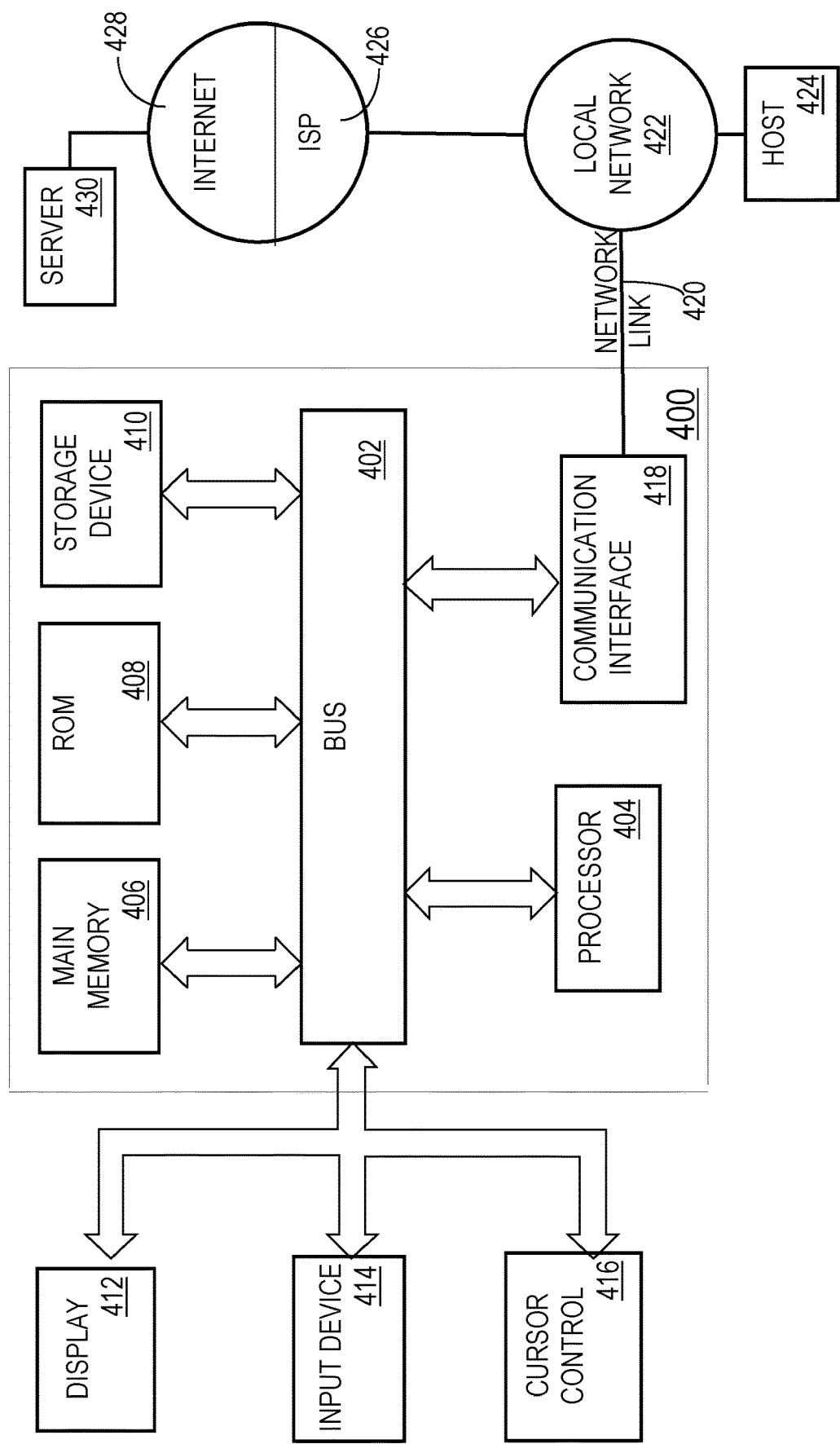
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A system comprising:
one or more processors;
one or more storage media storing instructions which, when executed by the one or more processors, cause:
   generating a first statistical prediction model for a particular content item;
   receiving an instruction to create a content item clone from the particular content item;
   in response to receiving the instruction, creating the content item clone based on attributes of the particular content item;
   generating, for the content item clone, a second statistical prediction model that is different than the first statistical prediction model;
   receiving a first request for content;
   in response to receiving the first request:
      identifying the content item clone as relevant to the first request;
      determining whether a similarity between (1) first content of the particular content item and (2) second content of the content item clone exceeds a similarity threshold;
      if the similarity exceeds the similarity threshold, then using the first statistical prediction model to generate a prediction of an entity user selection rate associated with the content item clone;
      if the similarity does not exceed the similarity threshold, then using the second statistical prediction model to generate the prediction of the entity user selection rate;
      based on the prediction, selecting the content item clone;

causing the content item clone to be transmitted over a network to be presented on a computing device.

2. The system of claim 1, wherein:
the particular content item is one of a plurality of content items associated with a particular content campaign;
the instruction is to create a campaign clone of the particular content campaign;
the instructions, when executed by the one or more processors, further cause:
generating, for each content item in the plurality of content items, a statistical prediction model that is different than the first statistical prediction model.

3. The system of claim 1, wherein the first statistical prediction model is used only if one or more criteria are satisfied, wherein the one or more criteria include a threshold similarity between a first target audience of the particular content item and a second target audience of the content item clone.

4. The system of claim 3, wherein the threshold similarity includes a first entity selection rate associated with the first target audience of the particular content item being classified as similar to a second entity selection rate associated with the second target audience of the content item clone.

5. The system of claim 1, wherein the first statistical prediction model is used only if one or more criteria are satisfied, wherein the one or more criteria include a charging model of the particular content item being the same as a charging model of the content item clone.

6. The system of claim 1, wherein, in response to receiving the first request, using the first statistical prediction model, wherein the instructions, when executed by the one or more processors, further cause:
receiving a second request for content;
in response to receiving the second request:
identifying the content item clone as relevant to the second request;
using the second statistical prediction model to generate a second prediction of the entity user selection rate;
based on the second prediction, selecting the content item clone;
causing the content item clone to be transmitted over the network to be presented on a second computing device.

7. The system of claim 1, wherein the instructions, when executed by the one or more processors, further cause:
determining a first time indicating when the content item clone became active;
wherein the first statistical prediction model is used only if a difference between a current time and the first time is less than a threshold period of time.

8. The system of claim 7, wherein the instructions, when executed by the one or more processors, further cause:
receiving an event that indicates the first time and that the content item clone was presented to a user;
in response to determining that the difference between the current time and the first time is less than the threshold period of time:
generating a mapping between an identifier of the content item clone and an identifier of the particular content item;
overwriting, based on the mapping, a copy of the second statistical prediction model with a copy of the first statistical prediction model using the mapping.

9. The system of claim 7, wherein the instructions, when executed by the one or more processors, further cause:
receiving an event that indicates the first time and that the content item clone was presented to a user;
in response to determining that the difference between the current time and the first time is greater than the threshold period of time:
refrain from generating a mapping between an identifier of the content item clone and an identifier of the particular content item.

10. The system of claim 1, wherein the instructions, when executed by the one or more processors, further cause:
generating a global statistical prediction model that is based on a plurality of attributes of multiple entities and a plurality of attributes of contexts of requests for content;
generating a plurality of campaign-specific statistical prediction models, each of which is based on a plurality of attributes of content items or a plurality of attributes of users interaction with the content items;
wherein the plurality of campaign-specific statistical prediction models includes the first and second statistical prediction models;
determining to use the first statistical prediction model and the global statistical prediction model in response to a particular request for content;
combining output of the first statistical prediction model and the global statistical prediction model to generate a score that is associated with the content item clone and is used to determine whether to select the content item clone for presentation.

11. A system comprising:
one or more processors;
one or more storage media storing instructions which, when executed by the one or more processors, cause:
generating a statistical prediction model of a particular content item;
receiving an instruction to create a content item clone from the particular content item;
in response to receiving the instruction:
identifying one or more first attribute values of the particular content item;
identifying one or more second attribute values of the content item clone;
performing a comparison of the one or more first attribute values and the one or more second attribute values, wherein the one or more first attribute values and the one or more second attribute values pertain to one or more of the following attributes: target audience, charging model, or content of the respective content items;
based on the comparison, determining whether to associate the statistical prediction model with the content item clone;
if it is determined to associate the statistical prediction model with the content item clone, then using the statistical prediction model to generate a first score for the content item clone in response to a first request for content;
if it is determined to not associate the statistical prediction model with the content item clone, then using a different statistical prediction model to generate a second score for the content item clone in response to a second request for content.

12. The system of claim 11, wherein the one or more first attribute values are of a first target audience of the particular content item, wherein the one or more second attribute values are of a second target audience of the content item clone.

13. The system of claim 12, wherein the one or more first attribute values include a first entity selection rate associated with the first target audience, wherein the one or more second attribute values includes a second entity selection rate associated with the second target audience.

14. The system of claim 11, wherein the one or more first attribute values indicate a first charging model of the particular content item, wherein the one or more second attribute values indicate a second charging model of the content item clone.

15. The system of claim 11, wherein the instructions, when executed by the one or more processors, further cause:
in response to receiving the first request:
identifying the content item clone as relevant to the first request;
based on an association between the statistical prediction model and the content item clone, using the statistical prediction model to generate a prediction of an entity user selection rate;
based on the prediction, selecting the content item clone;
causing the content item clone to be transmitted over a network to be presented on a computing device.

16. The system of claim 11, wherein the instructions, when executed by the one or more processors, further cause:
determining a first time indicating when the content item clone became active;
wherein the statistical prediction model is used only if a difference between a current time and the first time is less than a threshold period of time.

17. The system of claim 16, wherein the instructions, when executed by the one or more processors, further cause:
receiving an event that indicates the first time and that the content item clone was presented to a user;
in response to determining that the difference between the current time and the first time is less than the threshold period of time:
generating a mapping between an identifier of the content item clone and an identifier of the particular content item;
overwriting, based on the mapping, a copy of a second statistical prediction model with a copy of the statistical prediction model using the mapping.

18. The system of claim 16, wherein the instructions, when executed by the one or more processors, further cause:
receiving an event that indicates the first time and that the content item clone was presented to a user;
in response to determining that the difference between the current time and the first time is greater than the threshold period of time:
refrain from generating a mapping between an identifier of the content item clone and an identifier of the particular content item.

19. A system comprising:
one or more processors;
one or more storage media storing instructions which, when executed by the one or more processors, cause:
generating a statistical prediction model for a content delivery campaign that includes a content item;
while the content delivery campaign is active:
in response to a first content item selection event, using the statistical prediction model to generate a first prediction of an entity selection rate for the content item;
after using the statistical prediction model, receiving input that indicates one or more changes to the content delivery campaign, wherein the one or more changes are to targeting criteria of the content delivery campaign or to a charging model of the content delivery campaign;
in response to receiving the input, storing change data that indicates that the statistical prediction model is not to be used for the content delivery campaign;
in response to a second content item selection event:
refraining, based on the change data, from using the statistical prediction model to generate a second prediction of the entity selection rate for the content item; and
using a default statistical prediction model to generate the second prediction of the entity selection rate for the content item.

20. The system of claim 19, wherein the instructions when executed by the one or more processors, further cause, in response to receiving the input:
determining whether the one or more changes satisfy one or more change criteria;
wherein the change data is stored only in response to determining that the one or more changes satisfy the one or more change criteria.

* * * * *